July 28, 1959 W. A. WISEMAN 2,896,466
ANTI-BACKLASH DEVICE
Filed Feb. 7, 1958
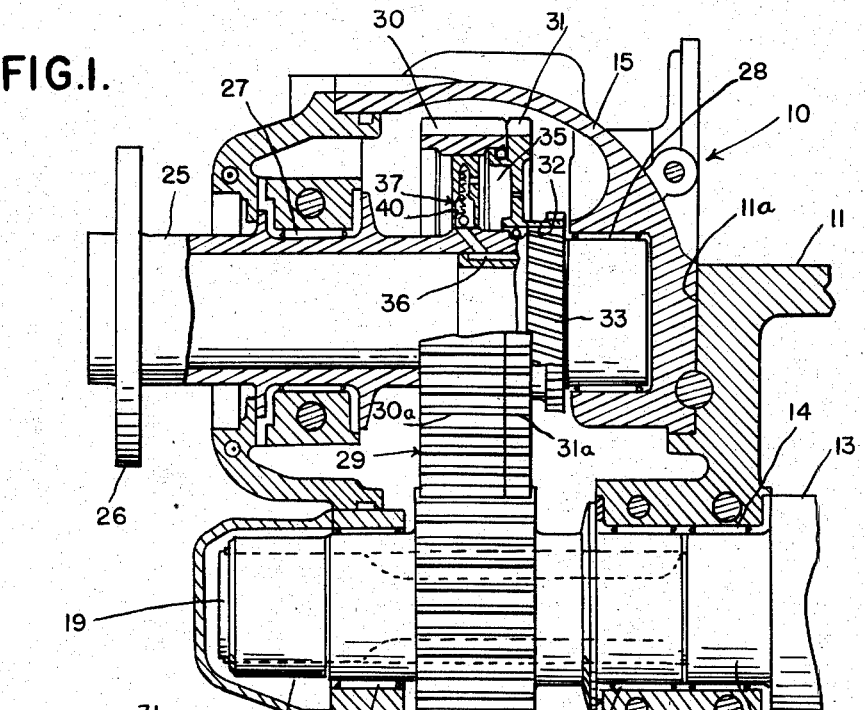
FIG.1.
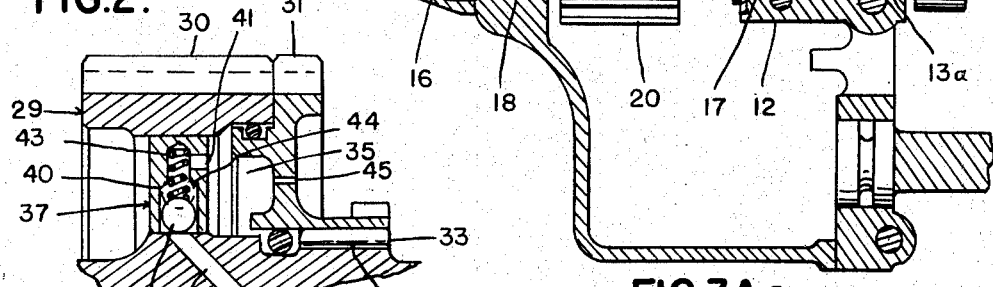
FIG.2.
FIG.2A. FIG.3A. FIG.3B.
FIG.3.
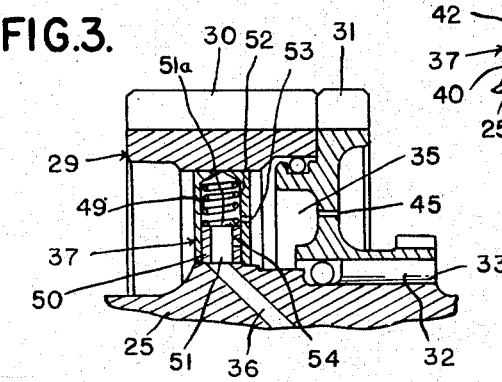
INVENTOR.
WILLIAM A. WISEMAN
BY
ATTORNEYS

United States Patent Office 2,896,466
Patented July 28, 1959

2,896,466
ANTI-BACKLASH DEVICE

William A. Wiseman, Muskegon, Mich., assignor to Continental Motors Corporation, a corporation of Virginia Application February 7, 1958, Serial No. 713,813

8 Claims. (Cl. 74—440)

My invention relates to anti-backlash devices for internal combustion engines for propeller driven aircraft and more particularly to a control means operable to effect anti-backlash gear engagement only at engine speeds producing gear rattle due to torsional vibrations in the propeller shaft driving gear chain.

Torsional harmonic vibrations transmitted from the engine crankshaft to the aircraft propeller through the reduction gearing drive chain are a major problem in aircraft engine operation, since the propeller blades, particularly at the blade tips, are subjected to severe strains at engine speeds producing such vibrations.

Various means can be embodied in the engine for dampening out these harmonic vibrations, but they generally add to engine weight and may require costly redesign when certain changes made to the engine construction alter the harmonic vibration characteristics. In smaller aircraft engines weight and simplicity of construction are of prime importance, yet fatigue life of propellers is dangerously affected by such torsional vibrations, which are most prevalent at engine idling speeds.

An object of the present invention is to counteract gear rattle caused by torsional vibrations of the engine by providing an anti-backlash device on the drive chain to the propeller controlled to have effect only at preselected engine speeds.

Another object of the invention is to improve anti-backlash operation by providing a centrifugally operated control means arranged to eliminate gear rattle at preselected engine speeds.

For a clearer understanding of the invention, reference may be had to the accompanying drawing illustrating preferred embodiments of the invention in which like reference characters refer to like parts throughout the several views and in which:

Fig. 1 is a fragmentary cross-sectional view of the forward part of a preferred aircraft engine embodying the invention.

Fig. 2 is a fragmentary enlarged view of the control means and gear portion of Fig. 1 with the control valve open.

Fig. 2A is a fragmentary detail of the control means of Fig. 2 with the valve closed.

Fig. 3 is a fragmentary view similar to Fig. 2 and showing a modified control means.

Fig. 3A is a fragmentary detail of the control means of Fig. 3 with the valve in a different position, and Fig. 3B is a fragmentary detail of the control means of Fig. 3 with the valve in yet another position.

In Fig. 1, the forward end of a preferred internal combustion engine 10 for a propeller driven aircraft is illustrated as having a crankcase 11 provided with a mounting face 11a. A boss 12 is provided on the face 11a for supporting the driving end 13a of a crankshaft 13 by means of a bearing 14. A gear housing 15 is mounted on the face 11a of the crankcase 11. A driving gear shaft 16 is supported at the inner end by a bearing 17 provided in the boss 12 and at the outer end by a bearing 18 carried by the housing 15.

The shaft 16 is axially aligned with the crankshaft 13 and directly driven thereby through a shaft 19. A driving gear 20 is provided on the driving shaft 16 within the housing 15. A propeller shaft 25 having a flange 26 adapted to carry a propeller (not shown) is supported in bearings 27 and 28 carried by the housing 15, and is provided with a driven gear 29 operatively engaged with the driving gear 20.

The driven gear 29 comprises a fixed gear portion 30 secured to the shaft 25 and a separate adjustable gear portion 31 provided with an internal helical spline 32 engaged with a matching external helical spline 33 provided on the shaft 25. The gear portions 30 and 31 are provided with matching gear teeth 30a and 31a respectively. The gear portions 30 and 31 are axially aligned and constructed to provide an intermediate pressure chamber 35 therebetween. A fluid pressure passage 36 is provided in the propeller shaft 25, preferably being part of, and supplied with fluid pressure from, the engine oil system (not shown). A control means 37 is provided to control pressure flow into the chamber 35, such as will displace the splined gear portion 31 axially, the helical splines 32 and 33 effecting an angular adjustment of the splined gear portion 32 with respect to the fixed gear portion 30. Both gear portions 30 and 31 being engaged with the driving gear 20, such angular adjustment of the gear portion 31 serves to effect locking engagement for preventing backlash caused by torsional vibrations by filling the backlash space between the driving and driven gears. The control means 37 acts to eliminate loading of the gear portion 31 when backlash control is not required.

The control means 37, as shown in the modification of Figs. 1, 2 and 2A, comprises a stepped control chamber 40 openly connected with the pressure passage 36 and by means of a part 41 with the chamber 35. A ball valve element 42 is resiliently urged to an open position against centrifugal force of the rotating gear 30 by means of a spring 43. Thus in this embodiment, fluid pressure would enter the chamber 35 at lower engine speeds and, as shown in Fig. 2A, the valve element 42 will move to a closed position by seating against shoulder 44 when centrifugal forces of higher engine speeds cause the valve element 42 to compress the spring 43. It will be apparent that the shutoff point may be predetermined by proper choice of the mass of the valve element 42, the rate of the spring 43, and the distance between the open and shut positions. When the pressure to chamber 35 is cut off, trapped fluid is permitted to escape, preferably through a small vent orifice 45 provided through the splined gear 31.

In the modification of the control means illustrated in Figs. 3, 3A and 3B, provision is made for directing fluid pressure to the chamber 35 at more than one point in the engine speed range by providing in a control chamber 49 a slide valve element 50 having a passage 51 open at all times to the pressure passage 36. In the lower, or idle speed ranges, a spring 52 urges the valve inward so that the open end 51a communicates through the chamber 49 with a port 53 opening to the chamber 35. As engine speed increases, centrifugal force acting on the valve element 50 then closes off the port 53 as shown in Fig. 3A. When engine speed has increased to a preselected value, a port 54 in the valve element 50 becomes aligned with the port 53 to again admit pressure to the chamber 35 as shown in Fig. 3B. As speed increases further, the port 53 will of course again be shut off. It will be apparent that proper choice of valve mass, spring rate, and positions and number of ports will provide means for effecting anti-backlash operation of the adjustable gear portion 31 at those engine speeds at which torsional vibrations tend to produce undesirable gear rattle acting on the propeller.

Although I have shown only two embodiments of the invention, it will be apparent to one skilled in the art to which the invention pertains that various changes and modifications may be made therein without departing from the spirit of the invention or the scope of the appended claims.

I claim:

1. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said control means selectively operable to axially adjust said splined gear portion whereby same is angularly adjusted relative to said fixed gear portion due to said helical splines.

2. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said control means comprising a fluid pressure passage and valve means selectively operable to connect said passage with said chamber to effect axial displacement of said splined gear portion whereby same is angularly adjusted relative to said fixed gear portion due to the helical spline engagement aforesaid.

3. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said control means comprising a fluid pressure passage and valve means selectively operable to connect said passage with said chamber to effect axial displacement of said splined gear portion whereby same is angularly adjusted relative to said fixed gear portion due to the helical spline engagement aforesaid, said valve means being carried by one of said gear portions and being selectively operable by centrifugal forces to open and close connection between said pressure passage and said chamber.

4. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said control means comprising a fluid pressure passage and valve means selectively operable to connect said passage with said chamber to effect axial displacement of said splined gear portion whereby same is angularly adjusted relative to said fixed gear portion due to the helical spline engagement aforesaid, said valve means being carried by one of said gear portions and being selectively operable by centrifugal forces to open and close connection between said pressure passage and said chamber, and vent means connected with said chamber to vent fluid pressure therefrom.

5. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said fixed gear portion having a control passage open at one end to said chamber, said propeller shaft having a fluid pressure passage connected to the other end of said control passage, said control means comprising a valve means disposed in said control passage and selectively operable by centrifugal forces to open and close same to connect said chamber with fluid pressure and effect axial displacement of said splined gear portion whereby same is angularly adjusted relative to said fixed gear portion due to the helical spline engagement aforesaid.

6. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said fixed gear portion having a control passage open at one end to said chamber, said propeller shaft having a fluid pressure passage connected to the other end of said control passage, said control means comprising a valve means disposed in said control passage and selectively operable by centrifugal forces to open and close same to connect said chamber with fluid pressure and effect axial displacement of said splined gear portion whereby same is angularly adjusted relative to said fixed gear portion due to the helical spline engagement aforesaid, said valve means comprising a valve element and a spring resiliently urging said valve element to an open position during engine idling speed operation, centrifugal force at higher engine speeds acting to move said valve element to closed position against the compression force of said spring.

7. In an internal combustion engine for propeller driven aircraft and having a crankcase, a crankshaft carried thereby, and a propeller shaft, a driving gear operably connected with said crankshaft, a driven gear carried by said propeller shaft and comprising two axially aligned relatively angularly adjustable gear portions operably engaged with said driving gear, and control means automatically operable only at preselected engine speeds to angularly adjust said gear portions, thereby effecting anti-backlash locking engagement thereof with said driving gear at said selected engine speeds, said propeller shaft having a helical spline portion, one of said gear portions being fixed to said propeller shaft and the other of said gear portions having a helical spline engaged with said propeller shaft helical spline, said gear portions being adjacent and having an annular pressure chamber intermediate thereof, said fixed gear portion having a control passage open at one end to said chamber, said propeller shaft having a fluid pressure passage connected to the other end of said control passage, said control means comprising a valve means disposed in said control passage and selectively operable by centrifugal forces to open and close same to connect said chamber with fluid pressure and effect axial displacement of said splined gear portion whereby same is angularly adjusted relative to said fixed gear portion due to the helical spline engagement aforesaid, said valve means comprising a valve element and a spring resiliently urging said valve element to an open position during engine idling speed operation, centrifugal force at higher engine speeds acting to move said valve element to closed position against the compression force of said spring, said control passage having an outlet port opening into said chamber, said valve means comprising a valve element having a passage connected with said fluid pressure passage at all times and outlet ports connected with said valve passage, a spring resiliently urging said valve element in a direction opposed to centrifugal forces of engine operation acting to shift said valve to selectively connect said valve outlet ports with said control passage outlet port at predetermined speeds of engine operation.

8. In an internal combustion engine having a crankcase, a crankshaft carried thereby, and a driven shaft subject to torsional vibrations at certain engine speeds, a driving gear operably connected with said crankshaft, a driven gear carried by said driven shaft and comprising two axially aligned gear portions each operably engaged directly with said driving gear and driven thereby at the same speed, one gear portion being angularly fixed to the driven shaft, the second gear portion having an adjustable driving connection with said driven shaft and operable to permit angular adjustment of the second gear portion with respect to said driven shaft, and control means automatically operable at the aforesaid engine speeds to angularly adjust said second gear portion relative to the driven shaft, thereby effecting anti-backlash locking engagement of said driven gear with said driving gear.

References Cited in the file of this patent
UNITED STATES PATENTS

| | | |
|---|---|---|
| 1,124,107 | Bugatti | Jan. 5, 1915 |
| 2,275,718 | Beringer | Mar. 10, 1942 |
| 2,386,367 | Taylor | Oct. 9, 1945 |
| 2,302,575 | Romaine et al. | Nov. 17, 1952 |
| 2,640,428 | Houghton | June 2, 1953 |